United States Patent
Chen et al.

(10) Patent No.: US 9,613,558 B2
(45) Date of Patent: Apr. 4, 2017

(54) PIXEL DRIVING METHOD AND ASSOCIATED DISPLAY DEVICE

(71) Applicant: INDUSTRIAL TECHNOLOGY RESEARCH INSTITUTE, Hsinchu (TW)

(72) Inventors: Heng-Yin Chen, Zhubei (TW); Sheng-Po Wang, Taoyuan (TW); Tsen-Yeh Lin, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 94 days.

(21) Appl. No.: 14/691,298

(22) Filed: Apr. 20, 2015

(65) Prior Publication Data

US 2016/0232827 A1 Aug. 11, 2016

(30) Foreign Application Priority Data

Feb. 9, 2015 (TW) .............................. 104104283 A

(51) Int. Cl.
| | | |
|---|---|---|
| *G09G 5/02* | (2006.01) | |
| *G09G 3/20* | (2006.01) | |
| *G06T 5/00* | (2006.01) | |

(52) U.S. Cl.
CPC ........... *G09G 3/2003* (2013.01); *G06T 5/002* (2013.01); *G06T 5/003* (2013.01); *G09G 5/02* (2013.01); *G09G 2300/0443* (2013.01); *G09G 2300/0452* (2013.01); *G09G 2310/06* (2013.01); *G09G 2310/08* (2013.01); *G09G 2320/0242* (2013.01); *G09G 2340/0407* (2013.01); *G09G 2360/16* (2013.01)

(58) Field of Classification Search
CPC combination set(s) only.
See application file for complete search history.

(56) References Cited

U.S. PATENT DOCUMENTS 6,339,417 B1 * 1/2002 Quanrud .............. G09G 3/3648
345/98
6,903,754 B2 6/2005 Brown Elliott
(Continued)

FOREIGN PATENT DOCUMENTS

| CN | 101510395 A | 8/2009 |
|---|---|---|
| TW | 200741617 A | 11/2007 |

(Continued)

OTHER PUBLICATIONS

Arnold et al., "Full-color AMOLED with RGBW pixel pattern", Journal of the SID Jun. 13, 2005, pp. 525-535.
(Continued)

*Primary Examiner* — Jonathan Boyd
*Assistant Examiner* — Sosina Abebe
(74) *Attorney, Agent, or Firm* — Birch, Stewart, Kolasch & Birch, LLP

(57) ABSTRACT

A pixel driving method comprises the following steps: receiving a display image comprising a plurality of image points, wherein each image point corresponds a display color; producing a first sub-image and a second sub-image according to the display image, wherein the first sub-image displays a part of the image points, while the second sub-image displays the other part of the image points; and displaying at least one of the first sub-image and the second sub-image on the color display panel.

18 Claims, 9 Drawing Sheets

(56) References Cited

U.S. PATENT DOCUMENTS

| | | | |
|---|---|---|---|
| 7,649,529 B2 | 1/2010 | Tanada et al. | |
| 7,663,299 B2 | 2/2010 | Chao et al. | |
| 7,883,386 B2 | 2/2011 | Ho et al. | |
| 8,223,168 B2 | 7/2012 | Brown Elliott et al. | |
| 8,780,019 B2 | 7/2014 | Choi et al. | |
| 2003/0160915 A1* | 8/2003 | Liu | G02F 1/133514 349/106 |
| 2011/0128622 A1* | 6/2011 | Chen | G02B 27/2214 359/464 |
| 2011/0304660 A1* | 12/2011 | Liao | G09G 3/3614 345/694 |
| 2013/0162861 A1* | 6/2013 | Yamamoto | H04N 13/02 348/222.1 |
| 2014/0168289 A1 | 6/2014 | Shibata et al. | |
| 2014/0292622 A1 | 10/2014 | Lee | |

FOREIGN PATENT DOCUMENTS

| | | |
|---|---|---|
| TW | 200802221 A | 1/2008 |
| TW | 200820186 A | 5/2008 |
| TW | 201042604 A1 | 12/2010 |
| TW | 201137841 A1 | 11/2011 |
| TW | 201209753 A1 | 3/2012 |
| TW | 201312502 A1 | 3/2013 |
| TW | 201324481 A1 | 6/2013 |
| TW | I426328 B | 2/2014 |
| TW | 201500827 A | 1/2015 |

OTHER PUBLICATIONS

Brown Elliott et al., "13.3 Co-Optimization of Color AMLCD Subpixel Architecture and Rendering Algorithms", SID 02 Digest, 2002, pp. 172-175.

Brown Elliott Elliott et al., "Development of the PenTile Matrix™ color AMLCD subpixel architecture and rendering algorithms", Journal of the SID Jan. 11, 2003, pp. 89-98.

Lai et al., "A Modified Stripe-RGBW TFT-LCD with Image-Processing Engine for Mobile Phone Displays", IEEE Transactions on Consumer Electronics, Nov. 2007, vol. 53, No. 4, pp. 1628-1633.

Suzuki et al., "Determination Method of Pixel Values for Combined Single-Line and Multi-Line Scanning Method for 120-Hz PDPs", SID 2013 Digest, 2013, pp. 53-56.

Yoon et al., "P-6: Development of the RGBW TFT-LCD with Data Rendering Innovation Matrix (DRIM)", SID 05 Digest, 2005, pp. 244-247.

* cited by examiner

PIXEL DRIVING METHOD AND ASSOCIATED DISPLAY DEVICE

This application claims the benefit of Taiwan application Serial No. 104104283, filed Feb. 9, 2015, the disclosure of which is incorporated by reference herein in its entirety.

TECHNICAL FIELD

The disclosure provides a pixel driving method and an associated display device.

BACKGROUND

Recently, the large-sized display panel and the high resolution image become a main trend of the display market. When the size of the display panel dramatically increasing, it would raise the difficulty and the cost of the circuit process which using the normal circuit design specification. Therefore, how to reach the high resolution on the large-sized display panel and meantime controlling the cost and decreasing the complexity of the circuit process is one of the urgent issues that need to be solved.

SUMMARY

The disclosure provides a pixel driving method for a color display panel and an associated display device.

According to an embodiment of the present disclosure, a pixel driving method applied in a display panel is provided. The display panel comprises a plurality of pixel blocks that each of which comprises a first pixel, a second pixel, a third pixel and a fourth pixel, wherein the first pixel and the second pixel are arranged sequentially along a first direction, the third pixel and the fourth pixel are arranged sequentially along the first direction, the first pixel and the third pixel are arranged sequentially along a second direction, the first pixel, the second pixel, the third pixel and the fourth pixel respectively comprises a plurality of sub-pixels, the sub-pixels in the first pixel and the sub-pixels in the second pixel that are adjacent to the sub-pixels in the first pixel have the same color, the sub-pixels in the first pixel and the sub-pixels in the third pixel that are adjacent to the sub-pixels in the first pixel have the same color, the sub-pixels in the second pixel and the sub-pixels in the fourth pixel that are adjacent to the sub-pixels in the second pixel have the same color, the sub-pixels in the third pixel and the sub-pixels in the fourth pixel that are adjacent to the sub-pixels in the third pixel have the same color. The pixel driving method comprises: a first image comprising a plurality of image points that each of which is corresponding to a display color is received; a first sub-image and a second sub-image are generated according to the first image, wherein the first sub-image displays a part of the image points through the pixel blocks, and the second sub-image displays another part of the image points through the pixel blocks; and at least one of the first sub-image and the second sub-image is displayed on the display panel.

According to an embodiment of the present disclosure, a display device is provided. The display device comprises a display panel and a pixel driving circuit. The display panel comprises a plurality of pixel blocks that each of which comprises a first pixel, a second pixel, a third pixel and a fourth pixel, wherein the first pixel and the second pixel are arranged sequentially along a first direction, the third pixel and the fourth pixel are arranged sequentially along the first direction, the first pixel and the third pixel are arranged sequentially along a second direction, the first pixel, the second pixel, the third pixel and the fourth pixel respectively comprises a plurality of sub-pixels, the sub-pixels in the first pixel and the sub-pixels in the second pixel that are adjacent to the sub-pixels in the first pixel have the same color, the sub-pixels in the first pixel and the sub-pixels in the third pixel that are adjacent to the sub-pixels in the first pixel have the same color, the sub-pixels in the second pixel and the sub-pixels in the fourth pixel that are adjacent to the sub-pixels in the second pixel have the same color, the sub-pixels in the third pixel and the sub-pixels in the fourth pixel that are adjacent to the sub-pixels in the third pixel have the same color. The pixel driving circuit is coupled to the display panel and configured to receive a first image, generate a first sub-image and a second sub-image according to the first image, and display at least one of the first sub-image and the second sub-image on the display panel; wherein the first image comprises a plurality of image points that each of which is corresponding to a display color, the first sub-image displays a part of the image points through the pixel blocks, and the second sub-image displays another part of the image points through the pixel blocks; wherein the first pixel comprises a first sub-pixel, a second sub-pixel, a third sub-pixel and a fourth sub-pixel, the second pixel comprises a fifth sub-pixel a sixth sub-pixel a seventh sub-pixel and an eighth sub-pixel, the third pixel comprises a ninth sub-pixel, a tenth sub-pixel, an eleventh sub-pixel and a twelfth sub-pixel, the fourth pixel comprises a thirteenth sub-pixel, a fourteenth sub-pixel, a fifteenth sub-pixel and a sixteenth sub-pixel; wherein the first sub-pixel, the second sub-pixel, the fifth sub-pixel and the sixth sub-pixel are arranged sequentially along the first direction, the third sub-pixel, the fourth sub-pixel, the seventh sub-pixel and the eighth sub-pixel are arranged sequentially along the first direction, the ninth sub-pixel, the tenth sub-pixel, the thirteenth sub-pixel and the fourteenth sub-pixel are arranged sequentially along the first direction, the eleventh sub-pixel, the twelfth sub-pixel, the fifteenth sub-pixel and the sixteenth sub-pixel are arranged sequentially along the first direction, the first sub-pixel, third sub-pixel, ninth sub-pixel and the eleventh sub-pixel are arranged sequentially along the second direction; and wherein the first sub-pixel, the sixth sub-pixel, the eleventh sub-pixel and the sixteenth sub-pixel have the same color; the second sub-pixel, the third sub-pixel, the fifth sub-pixel, the eighth sub-pixel, the ninth sub-pixel, the twelfth sub-pixel, the fourteenth sub-pixel and the fifteenth sub-pixel have the same color; the fourth sub-pixel, the seventh sub-pixel, the tenth sub-pixel and the thirteenth sub-pixel have the same color.

According to an embodiment of the present disclosure, a pixel driving circuit is provided. The pixel driving circuit comprises an image processor and a driver. The image processor receives a first image, and generates a first sub-image and a second sub-image according to the first image, wherein the first image comprises a plurality of image points that each of which is corresponding to a display color. The driver is coupled to the image processor, and outputs at least one of the first sub-image and the second sub-image, wherein the first sub-image and the second sub-image are applied in a display panel comprising a plurality of pixel blocks, the first sub-image displays a part of the image points through the pixel blocks, the second sub-image displays another part of the image points through the pixel blocks, each of the pixel bocks comprises a first pixel, a second pixel, a third pixel and a fourth pixel, the first pixel and the second pixel are arranged sequentially along a first direction, the third pixel and the fourth pixel are arranged sequentially along the first direction, the first pixel and the third pixel are arranged sequentially along a second direction, the first pixel, the second pixel, the third pixel and the fourth pixel respectively comprises a plurality of sub-pixels, the sub-pixels in the first pixel and the sub-pixels in the second pixel that are adjacent to the sub-pixels in the first pixel have the same color, the sub-pixels in the first pixel and the sub-pixels in the third pixel that are adjacent to the sub-pixels in the first pixel have the same color, the sub-pixels in the second pixel and the sub-pixels in the fourth pixel that are adjacent to the sub-pixels in the second pixel have the same color, the sub-pixels in the third pixel and the sub-pixels in the fourth pixel that are adjacent to the sub-pixels in the third pixel have the same color.

Figure 1:
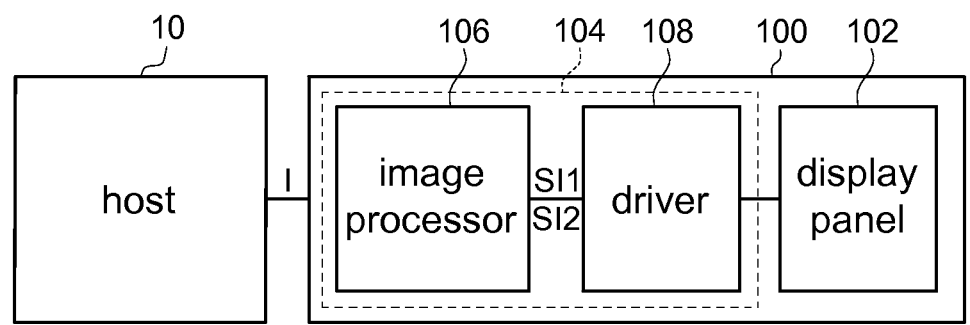
FIG. 1 illustrates a schematic diagram of a display device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosure provides a method of outputting a high-resolution image by an existing driving circuit that has lower resolution and without increases the number of pins.

FIG. 1 illustrates a schematic diagram of a display device 100 according to an embodiment of the present disclosure. The display device 100 may display frames in response to signals of images I sent from a host 10. The display device 100 may be a liquid crystal display (LCD), an organic light-emitting diodes (OLED) display or any type of display. The display device 100 can be used in E-books, mobile phones, tablet computers, televisions, notebook computers, digital picture frames, navigation systems or any other products having display functions.

The display device 100 mainly includes a pixel driving circuit 104 and a display panel 102. In an embodiment, the pixel driving circuit 104 includes an image processor 106 and a driver 108. The image processor 106 is configured to receive the image I and generate a first sub-image SI1 and a second sub-image 512 according to the image I. In an embodiment, the image processor 106 can be integrated into the host 210 and not in the pixel driving circuit 104. The image I may be a frame of image data to be displayed, which includes a plurality of image points that each of which is corresponding to one display color (e.g., one pixel data).

The driver 108, coupled to the image processor 106, is used to output at least one of the first sub-image SI1 and the second sub-image 512. The resolution of the first sub-image SI1 and the second sub-image 512 may be lower than that of the image I. By re-arranging and re-defining the sub-pixels of the first sub-image SI1 and the second sub-image 512, the display panel 102 can then use the first sub-image SI1 and/or the second sub-image 512 to display a higher-resolution image that is close to the image I, thereby lowering the hardware requirements for the display device 100.

Figure 2:
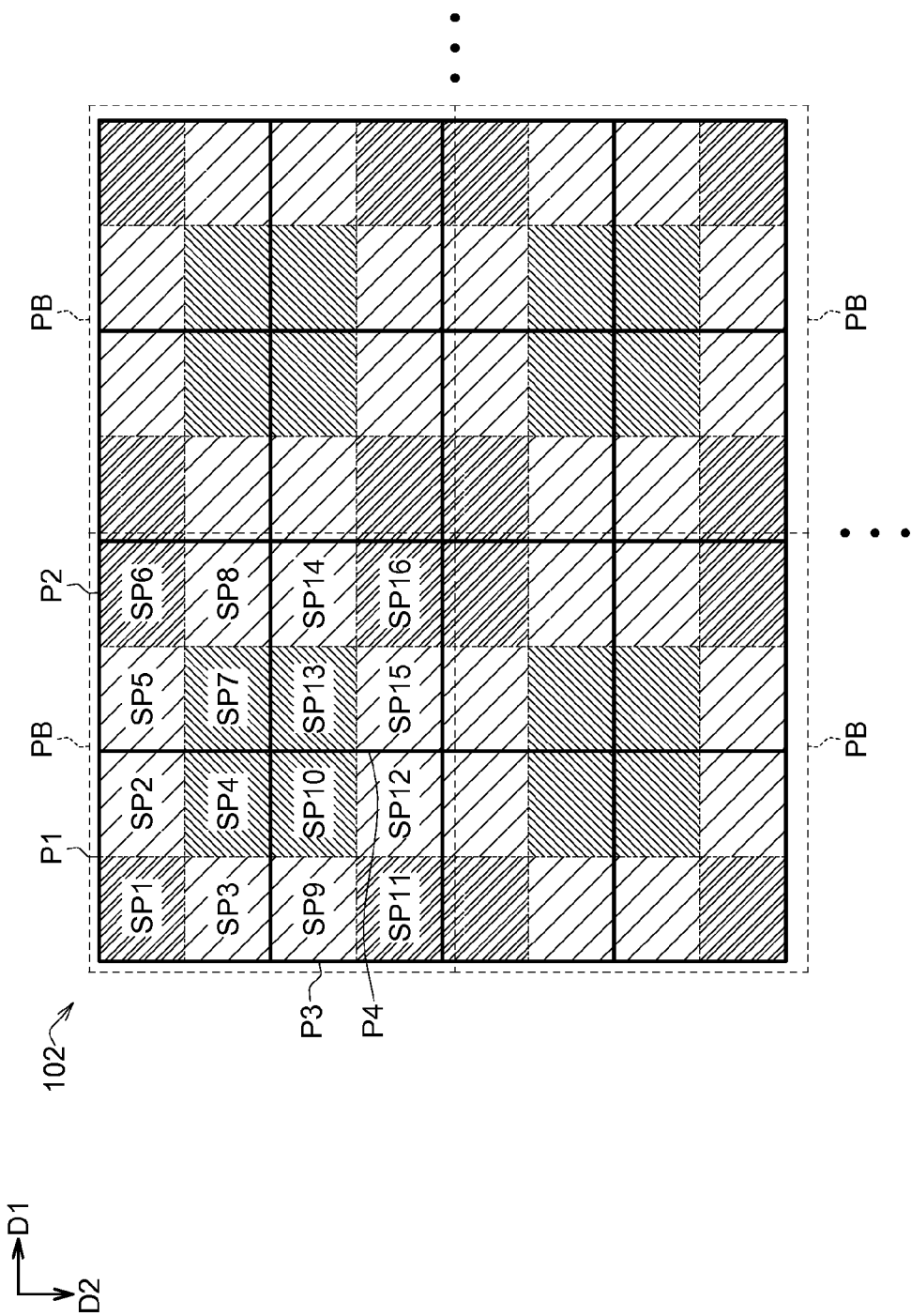
FIG. 2 illustrates an exemplary pixel arrangement of the display panel according to an embodiment of the present disclosure.

FIG. 2 illustrates an exemplary pixel arrangement of the display panel 102 according to an embodiment of the present disclosure. The display panel 102 includes a plurality of pixel blocks PB that each of which includes 2×2 pixels, that is, pixels P1, P2, P3 and P4. The pixels P1-P4 are arranged in a 2×2 matrix. As shown in FIG. 2, the pixels P1 and P2 are arranged sequentially along the direction D1 (e.g., a horizontal direction or an arbitrary direction axis), the pixels P3 and P4 are arranged sequentially along the direction D1, and the pixels P1 and P3 are arranged sequentially along another direction D2 (e.g., a vertical direction or another direction axis).

The pixels P1, P2 P3 and P4 respectively include a matrix of 2×2 sub-pixels. As shown in FIG. 2, the pixel P1 includes sub-pixels SP1-SP4, the pixel P2 includes sub-pixels SP5-SP8, the pixel P3 includes sub-pixels SP9-SP12, and the pixel P4 includes sub-pixels SP13-SP16, wherein the sub-pixels SP1, SP2, SP5 and SP6 are arranged sequentially along the direction D1, the sub-pixels SP3, SP4, SP7 and SP8 are arranged sequentially along the direction D1, the sub-pixels SP9, SP10, SP13 and SP14 are arranged sequentially along the direction D1, the sub-pixels SP11, SP12, SP15 and SP16 are arranged sequentially along the direction D1, and the sub-pixels SP1, SP3, SP9 and SP11 are arranged sequentially along the direction D2.

In an embodiment, sub-pixels in different pixels but adjacent to each other have the same color. As shown in FIG. 2, the sub-pixel SP2 (or SP4) of pixel P1 is adjacent to the sub-pixel SP5 (or SP7) of pixel P2, and both of them (SP2 and SP5; SP4 and SP7) have the same color. Similarly, the sub-pixel SP3 (or SP4) of pixel P1 is adjacent to the sub-pixel SP9 (or SP10) of pixel P3, and both of them (SP3 and SP9; SP4 and SP10) have the same color; the sub-pixel SP7 (or SP8) of pixel P2 is adjacent to the sub-pixel SP13 (or SP14) of pixel P4, and both of them (SP7 and SP13; SP8 and SP14) have the same color; and the sub-pixel SP10 (or SP12) of pixel P3 is adjacent to the sub-pixel SP13 (or SP15) of pixel P4, and both of them (SP10 and SP13; SP12 and SP15) have the same color. In an embodiment, two sub-pixels adjacent to each other but in different pixels can be provided with color filters with the same color so that these two sub-pixels may show the same color.

With the abovementioned configuration, in one pixel block PB, the sub-pixels SP1, SP6, SP11 and SP16 may have the same color, e.g., a first color; the sub-pixels SP2, SP3, SP5, SP8, SP9, SP12, SP14 and SP15 may also have the same color, e.g., a second color; and the sub-pixels SP4, SP7, SP10 and SP13 may have the same color, e.g., a third color, wherein the first, second and third colors may comprise a red color, a blue color and a green color, or can be any combination of them, but the present disclosure is not limited thereto.

Figure 3:
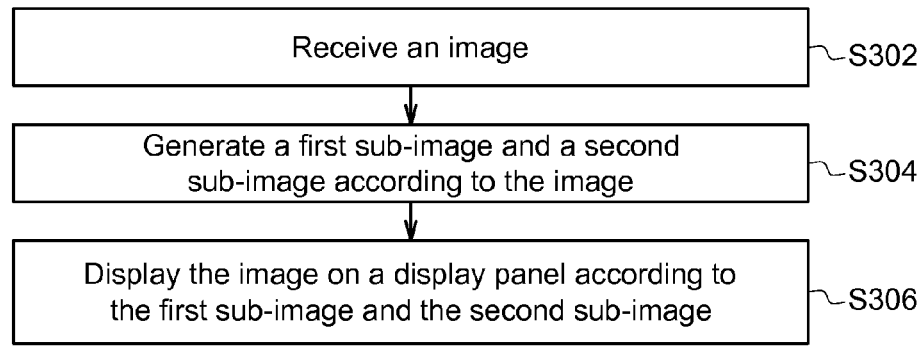
FIG. 3 illustrates a flowchart of a pixel driving method applied in the display panel according to an embodiment of the present disclosure.
Figure 4:
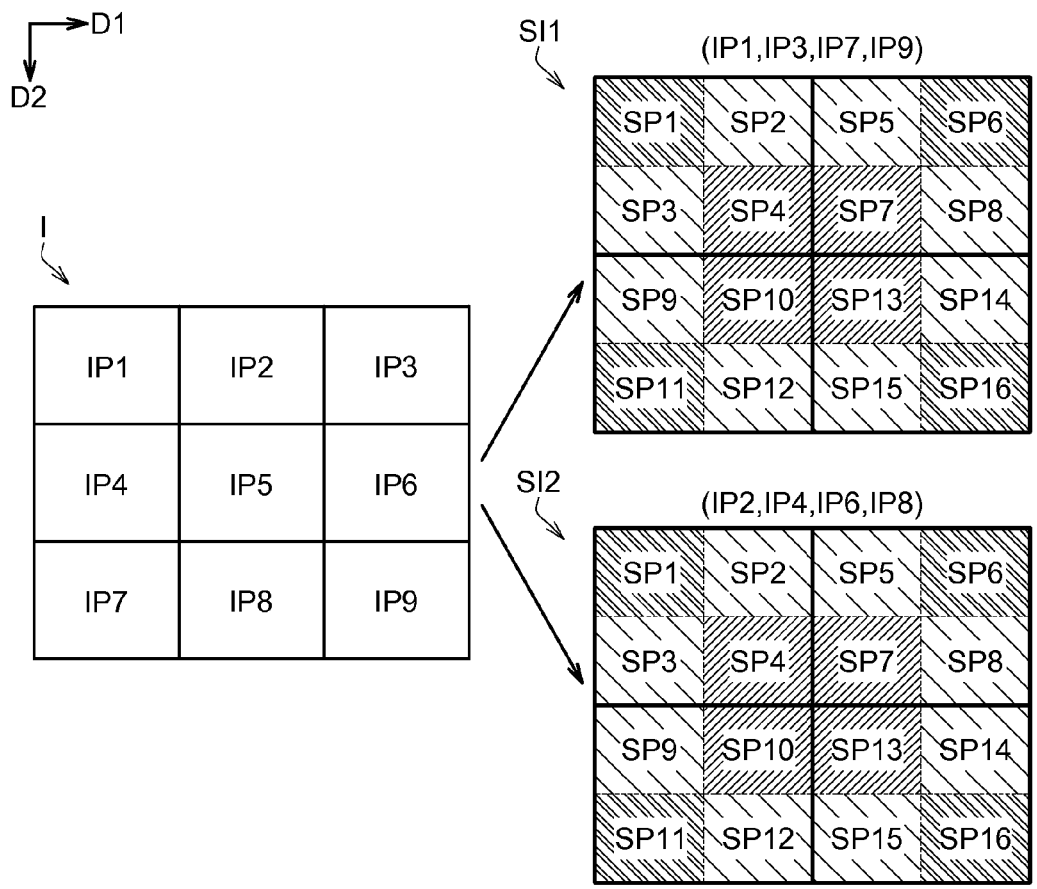
FIG. 4 illustrates a schematic diagram of generating the first sub-image and the second sub-image according to the image.

Please refer to FIGS. 3 and 4. FIG. 3 illustrates a flowchart of a pixel driving method applied in the display panel 102 according to an embodiment of the present disclosure. FIG. 4 illustrates a schematic diagram of generating the first sub-image SP1 and the second sub-image SP2 according to the image I.

At step S303, the display device 100 receives an image I that includes, for example, a plurality of image points that each of which corresponds to a display color.

At step S304, the pixel driving circuit 104 generates the first sub-image SP1 and the second sub-image SP2 according to the image I, wherein the first sub-image SP1 is to show a part of the image points through the pixel block PB, while the second sub-image SP2 is to show another part of the image points through the pixel block PB.

At step S306, the display panel 102 displays at least one of the first sub-image SP1 and the second sub-image SP2 to present the image I.

As shown in FIG. 4, after the display device 100 receives the image points IP1-1P9 of the image I, the pixel driving circuit 104 may separate these image points IP1-1P9 into two groups to form the first sub-image SP1 and the second sub-image SP2. The image points IP1-1P9 are arranged in a 3×3 matrix, that is, the image points IP1-1P3, the image points IP4-1P6 and the image points IP7-1P9 are arranged sequentially along the direction D1, respectively, and the image points IP1, IP4 and IP7 are arranged sequentially along another direction D2.

In the example, the first sub-image SI1 is configured to show the image points IP1, IP3, IP7 and IP9 through the pixel block PB shown in FIG. 2, while the second sub-image SI2 is configured to show the image points IP2, IP4, IP6 and IP8 through the pixel block PB. By showing the first sub-image SI1 and the second sub-image 512 alternatively, or adopting any other kind of display schedule for these two sub-images, it can use less number of pixels (e.g., four pixels, P1-P4) to present the image I with higher resolution (e.g., corresponding to 9 pixel data). For example, with the proposed method of the disclosure, a display panel of 1280×800 resolution can be used to present an image of 1920×1200 resolution. In such instance, the horizontal and vertical resolution could increase about 1.5 times. Understandably, the above examples are just for illustrating, not intended to limit the disclosure.

In some embodiments, the ways to generate the first sub-image SP1 and the second sub-image SP2 can be implemented by the following steps. To simplify the illustration, below, the number of pixel block PB is exemplified by one, but the present disclosure is not limited thereto.

For example, steps to generate the first sub-image SI1 may include:
  displaying the image point IP1 by the pixel P1;
  displaying the image point IP3 by the pixel P2;
  displaying the image point IP7 by the pixel P3; and
  displaying the image point IP9 by the pixel P4.

The rationale behind the setting of the image points is that the image points IP1, IP3, IP7 and IP9 are respectively located at the upper-left, upper-right, lower-left and lower-right corners of the image I, and these image points IP1-IP4 has the same relative position relationship with that of the pixels P1-P4. Thus, the pixels P1, P2, P3 and P4 are respectively used to display the image points IP1, IP3, IP7 and IP9.

On the other hand, steps to generate the second sub-image SI2 may include:
  arranging sub-pixels in the pixels P1 and P2 to define a first re-arranged pixel to display the image point IP2;
  arranging sub-pixels in the pixels P1 and P3 to define a second re-arranged pixel to display the image point IP4;
  arranging sub-pixels in the pixels P2 and P4 to define a third re-arranged pixel to display the image point IP6; and
  arranging sub-pixels in the pixels P3 and P4 to define a fourth re-arranged pixel to display the image point IP8.

The reason behind the setting of the image points is that since the image points IP2, IP4, IP6 and IP8 are respectively located at the top, left, right and bottom sides of the image I, the pixels P1 and P2, which are on the top side of the pixel block PB, can be used to define the image point IP2, the pixels P1 and P3, which are on the left side of the pixel block PB, can be used to define the image point IP4, the pixels P2 and P4, which are on the right side of the pixel block PB, can be used to define the image point IP6, and the pixels P3 and P4, which are on the bottom side of the pixel block PB, can be used to define the image point IP8, such that the image I can be correctly displayed.

Each of the first, second, third and fourth re-arranged pixels may be defined by a 7-shaped arrangement or a T-shaped arrangement of the sub-pixels. For example, to define a first re-arranged pixel having a 7-shaped sub-pixel arrangement, the pixel driving circuit 104 may select a first string of sub-pixels from the pixels P1 and P2 along the direction D1, and combine the first sub-pixel string with a sub-pixel which is arranged along another direction D2 and adjacent to one end of the first sub-pixel string. Also, to define a second re-arranged pixel with the 7-shaped sub-pixel arrangement, the pixel driving circuit 104 may select a second string of sub-pixels from the pixels P1 and P3 along the direction D2, and combine the second sub-pixel string with a sub-pixel which is arranged along the direction D1 and is adjacent to one end of the second sub-pixel string. Again, to define a third re-arranged pixel having the 7-shaped sub-pixel arrangement, the pixel driving circuit 104 may select a third string of sub-pixels from the pixels P2 and P4 along the direction D2, and combine the third sub-pixel string with a sub-pixel which is arranged along the direction D1 and is adjacent to one end of the third sub-pixel string. And, to define a fourth re-arranged pixel having the 7-shaped sub-pixel arrangement, the pixel driving circuit 104 may select a fourth string of sub-pixels from the pixels P3 and P4 along the direction D1, and combine the fourth sub-pixel string with a sub-pixel which is arranged along the direction D2 and is adjacent to one end of the fourth sub-pixel string.

In another example, the pixel driving circuit 104 may select a first string of sub-pixels from the pixels P1 and P2 along the direction D1, and combine the first sub-pixel string with a sub-pixel which is arranged along another direction D2 and adjacent to the middle sub-pixel of the first sub-pixel string to define a first re-arranged pixel having a T-shaped sub-pixel arrangement. Similarly, the pixel driving circuit 104 may select a second string of sub-pixels from the pixels P1 and P3 along the direction D2, and combine the second sub-pixel string with a sub-pixel which is arranged along the direction D1 and adjacent to the middle sub-pixel of the second sub-pixel string to define a second re-arranged pixel having the T-shaped sub-pixel arrangement. The pixel driving circuit 104 may also select a third string of sub-pixels from the pixels P2 and P4 along the direction D2, and combine the third sub-pixel string with a sub-pixel which is arranged along the direction D1 and is adjacent to the middle sub-pixel of the third sub-pixel string to define a third re-arranged pixel having the T-shaped sub-pixel arrangement. And, the pixel driving circuit 104 may select a fourth string of sub-pixels from the pixels P3 and P4 along the direction D1, and combine the fourth sub-pixel string with a sub-pixel which is arranged along the direction D2 and is adjacent to the middle sub-pixel of the fourth sub-pixel string to define a fourth re-arranged pixel having the T-shaped sub-pixel arrangement.

Understandably, the present disclosure is not limited to the above examples. In some embodiments, the correspondence between the pixels/sub-pixels in a sub-image and the image points can be adjusted and modified according to the relative positions of the image points of the image.

Figure 5:
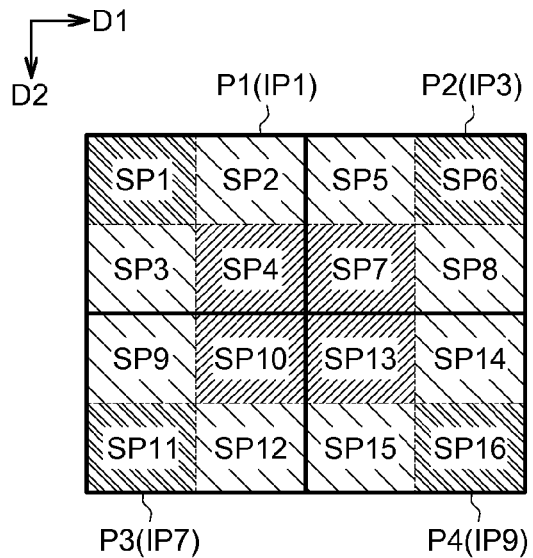
FIG. 5 illustrates a schematic diagram of the first sub-image according to an embodiment of the present disclosure.

FIG. 5 illustrates a schematic diagram of the first sub-image SI1 according to an embodiment of the present disclosure. The first sub-image SI1 described herein is exemplified by one pixel block PB. As shown in FIG. 5, the image point IP1 is defined by the pixel P1, the image point IP3 is defined by the pixel P2, the image point IP7 is defined by the pixel P3, and the image point IP9 is defined by the pixel P4. As mentioned earlier, the locations of the pixels P1-P4 in the pixel block PB are corresponding to locations of the image points IP1, IP3, IP7 and IP9 in the image I.

Figure 6A:
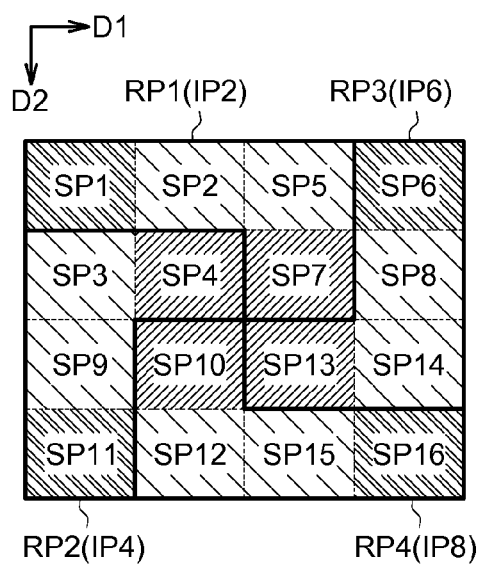
FIG. 6A illustrates an example of a re-arranged pixel defined by 7-shaped arrangement of sub-pixels according to an embodiment of the present disclosure.

FIG. 6A illustrates an example of a re-arranged pixel defined by 7-shaped arrangement of sub-pixels according to an embodiment of the present disclosure. As shown in FIG. 6A, in the pixels P1 and P2, the string of sub-pixels SP1-SP2 and SP5 extended along the direction D1 is combined with the sub-pixel SP7, which is arranged along the direction D2 and is adjacent to the sub-pixel SP5, to form a 7-shaped arrangement. Such arrangement is for first re-arranged pixel RP1 (because such arrangement is located on the top side of the pixel block PB), and can be used to display the image point IP2. Based on the similar design strategy, the sub-pixels SP3, SP4, SP9 and SP11 can be used to form a second re-arranged pixel RP2 with 7-shaped arrangement to display the image point IP4 (because such arrangement is located on the left side of the pixel block PB); the sub-pixels SP6, SP8, SP13 and SP14 can be used to form a third re-arranged pixel RP3 with 7-shaped arrangement to display the image point IP6 (because such arrangement is located on the right side of the pixel block PB); and, the sub-pixels SP10, SP12, SP15 and SP16 can be used to form a fourth re-arranged pixel RP4 with 7-shaped arrangement to display the image point IP8 (because such arrangement is located on the bottom side of the pixel block PB).

Figure 6B:
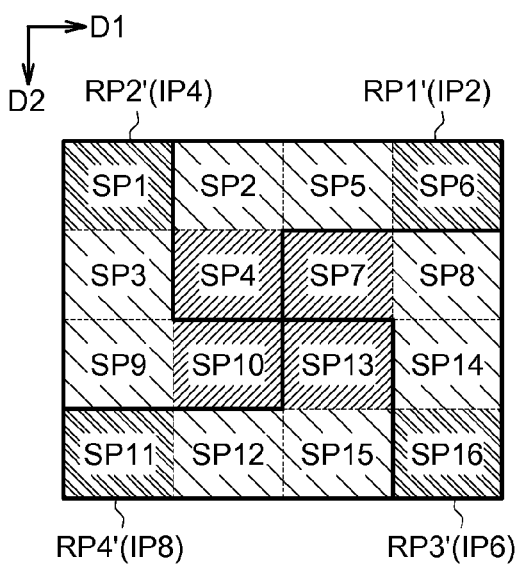
FIG. 6B illustrates another example of a re-arranged pixel defined by 7-shaped arrangement of sub-pixels according to an embodiment of the present disclosure.

FIG. 6B illustrates another example of a re-arranged pixel defined by 7-shaped arrangement of sub-pixels according to an embodiment of the present disclosure. As shown in FIG. 6B, in the pixels P1 and P2, the string of sub-pixels SP2-SP5 and SP6 extended along the direction D1 is combined with the sub-pixel SP4, which is arranged along the direction D2 and is adjacent to the sub-pixel SP2, to form a 7-shaped arrangement. Such arrangement is for the first re-arranged pixel RP1' to display the image point IP2 (because such arrangement is located on the top side of the pixel block PB). Based on the similar design strategy, the sub-pixels SP1, SP3, SP9 and SP10 can be used to form a second re-arranged pixel RP2' with 7-shaped arrangement to display the image point IP4 (because such arrangement is located on the left side of the pixel block PB); the sub-pixels SP7, SP8, SP14 and SP16 can be used to form a third re-arranged pixel RP3' with 7-shaped arrangement to display the image point IP6 (because such arrangement is located on the right side of the pixel block PB); and, the sub-pixels SP11, SP12, SP13 and SP15 can be used to form a fourth re-arranged pixel RP4' with 7-shaped arrangement to display the image point IP8 (because such arrangement is located on the bottom side of the pixel block PB).

Figure 7A:
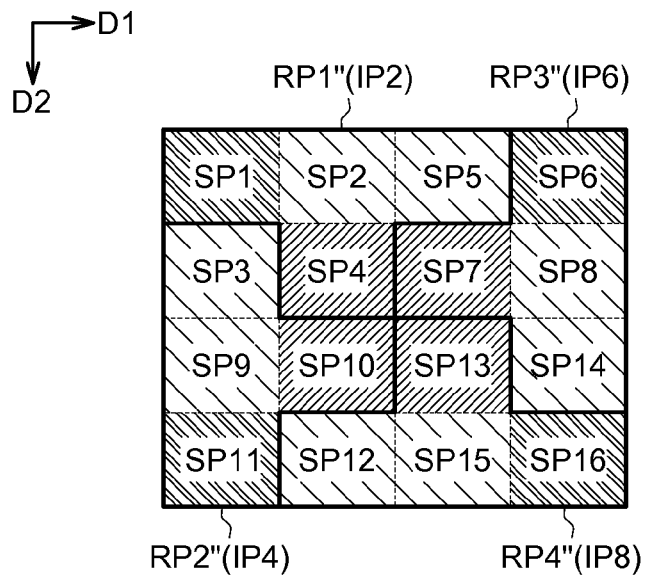
FIG. 7A illustrates an example of a re-arranged pixel defined by T-shaped arrangement of sub-pixels according to an embodiment of the present disclosure.

FIG. 7A illustrates an example of a re-arranged pixel defined by T-shaped arrangement of sub-pixels according to an embodiment of the present disclosure. As shown in FIG. 7A, in the pixels P1 and P2, the string of sub-pixels SP1-SP2 and SP5 extended along the direction D1 is combined with the sub-pixel SP4, which is arranged along the direction D2 and is adjacent to the middle sub-pixel (SP2) of the sub-pixel string, to form a T-shaped arrangement. Such arrangement is for the first re-arranged pixel RP1" to display the image point IP2 (because such arrangement is located on the top side of the pixel block PB). Based on the similar design strategy, the sub-pixels SP3, SP9, SP10 and SP11 can be used to form a second re-arranged pixel RP2" with T-shaped arrangement to display the image point IP4 (because such arrangement is located on the left side of the pixel block PB); the sub-pixels SP6, SP7, SP8 and SP14 can be used to form a third re-arranged pixel RP3" with T-shaped arrangement to display the image point IP6 (because such arrangement is located on the right side of the pixel block PB); and, the sub-pixels SP12, SP13, SP15 and SP16 can be used to form a fourth re-arranged pixel RP4" with T-shaped arrangement to display the image point IP8 (because such arrangement is located on the bottom side of the pixel block PB).

Figure 7B:
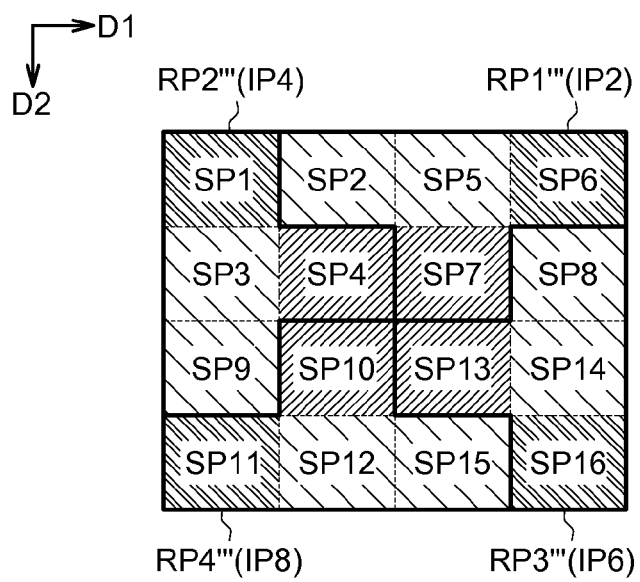
FIG. 7B illustrates another example of a re-arranged pixel defined by T-shaped arrangement of sub-pixels according to an embodiment of the present disclosure.

FIG. 7B illustrates another example of a re-arranged pixel defined by T-shaped arrangement of sub-pixels according to an embodiment of the present disclosure. As shown in FIG. 7B, in the pixels P1 and P2, the string of sub-pixels SP2、SP5 and SP6 extended along the direction D1 is combined with the sub-pixel SP7, which is arranged along the direction D2 and is adjacent to the middle sub-pixel (SP5) of the sub-pixel string, to form a T-shaped arrangement. Such arrangement is for the first re-arranged pixel RP1''' to display the image point IP2 (because such arrangement is located on the top side of the pixel block PB). Based on the similar design strategy, the sub-pixels SP1, SP3, SP4 and SP9 can be used to form a second re-arranged pixel RP2''' with T-shaped arrangement to display the image point IP4 (because such arrangement is located on the left side of the pixel block PB); the sub-pixels SP8, SP13, SP14 and SP16 can be used to form a third re-arranged pixel RP3''' with T-shaped arrangement to display the image point IP6 (because such arrangement is located on the right side of the pixel block PB); and, the sub-pixels SP10, SP11, SP12 and SP15 can be used to form a fourth re-arranged pixel RP4''' with T-shaped arrangement to display the image point IP8 (because such arrangement is located on the bottom side of the pixel block PB).

Figure 8:
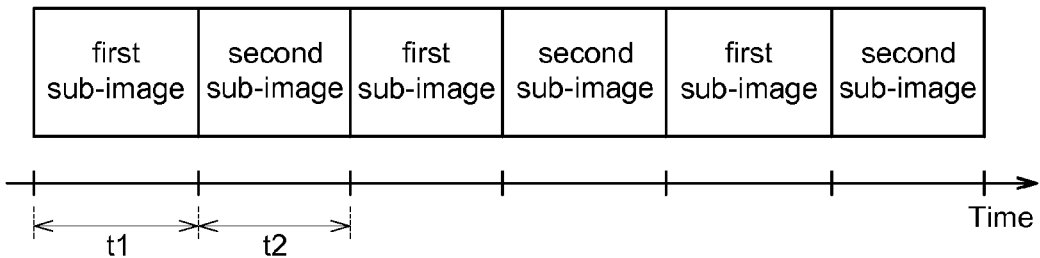
FIG. 8 illustrates an exemplary driving waveform according to an embodiment of the present disclosure.

For some embodiments, there are two types of methods to present images I on the display panel 102 according to the first sub-image SI1 and the second sub-image SI2. One is displaying these sub-images sequentially, and the other one is displaying these sub-images after combining them. FIGS. 8 to 11 are exemplary driving waveforms with in terms of time-division displaying according to embodiments of the present disclosure. Referring to FIG. 8, an exemplary driving waveform according to an embodiment of the present disclosure is shown. In this example, the driver 108 sequentially displays the first sub-image SI1 in a first time period t1 and the second sub-image SI2 in a second time period t2. The lengths of the first time period t1 and the second time period t2 are the same. Such driving mechanism can be regarded as a fixed frequency driving, wherein the driving frequency may be, for example, 120 Hz.

Figure 9:
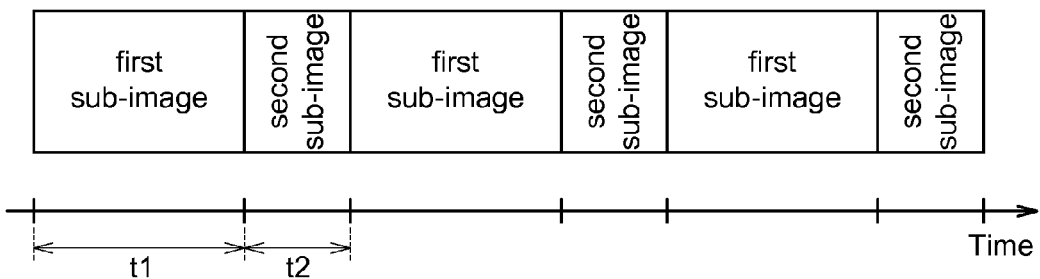
FIG. 9 illustrates an exemplary driving waveform according to another embodiment of the present disclosure.

FIG. 9 illustrates an exemplary driving waveform according to another embodiment of the present disclosure. In this example, the driver 108 sequentially displays the first sub-image SI1 in the first time period t1 and the second sub-image SI2 in the second time period t2, wherein the length of the first time period t1 is larger than that of the second time period t2. Such driving mechanism can be regarded as a non-fixed frequency driving. In another embodiment, the length of the first time period t1 may be smaller than that of the second time period t2.

In the abovementioned embodiments, sum of the lengths of the first and second time periods t1 and t2 are equal to the display time of the image I. In addition, the display frequency of the first sub-image SI1 or the second sub-image SI2 can be twice as long as the display frequency of the image I, but the present disclosure is not limited thereto.

Figure 10:
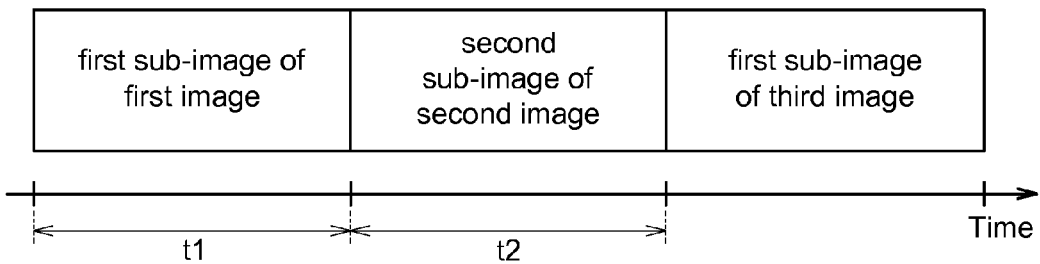
FIG. 10 illustrates an exemplary driving waveform according to still another embodiment of the present disclosure.

FIG. 10 illustrates an exemplary driving waveform according to still another embodiment of the present disclosure. In this example, the driver 108 displays the first sub-image SI1 for a first image (e.g., an image corresponding to the current frame) in the first time period and displays the second sub-image SI2 for a second image (e.g., an image corresponding to the next frame) in the second time period t2, and so on. The lengths of the first and second time periods t1 and t2 are equal, and hence such driving mechanism can be regarded as a fixed frequency driving, for example with a driving frequency of 60 HZ. That is, the length of the first time period t1 or the second time period t2 is equal to the display time of an image I. Understandably, for a situation of less changing of the image content, even though the driving method of the embodiment of FIG. 10 is adopted, which does not show the second sub-image SI2 of the first image and the first sub-image SI1 of the second image, the whole image content still can be smoothly displayed due to the persistence of vision of the human eye.

Figure 11:
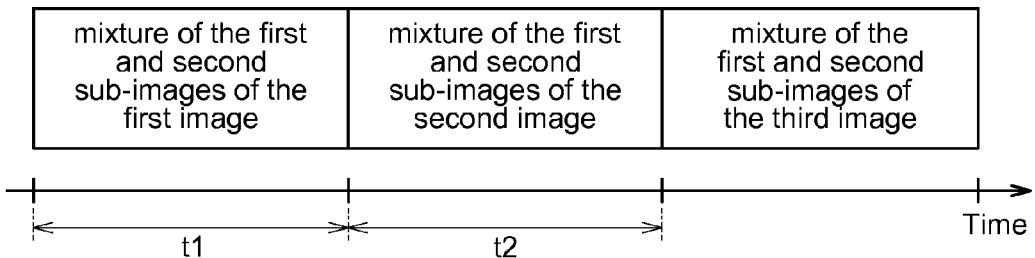
FIG. 11 illustrates an exemplary driving waveform according to still another embodiment of the present disclosure.

FIG. 11 illustrates an exemplary driving waveform according to still another embodiment of the present disclosure. In this example, the driver 108 may display the mixture of the first sub-image SI1 and the second sub-image SI2 with the display frequency of the image I. The way of mixing these sub-images can be implemented by averaging the first sub-image SI1 and the second sub-image SI2 point to point. For example, the information of the mixed image can be obtained by averaging the sum of the sub-pixel SP1 of the first sub-image SI1 and the sub-pixel SP1 of the second sub-image SI2. In another embodiment of the disclosure, the mixing method can be implemented with the weighted average of the sub-images according to the image content.

According to the embodiment of sequentially displaying the first sub-image SI1 and the second sub-image SI2, it could be understood that by rapidly switching the images, the content of the first sub-image SI1 and the second sub-image SI2 can be mixed due to the persistence of vision on the human eyes, such that the human eye may get the image information. Besides, the way of driving the images can be determined by the image content and switched between the above embodiments. In addition, the whole image can be divided into several areas according to the image content, wherein the areas can be displayed with different driving methods. The disclosure is not limited thereto.

Figure 12:
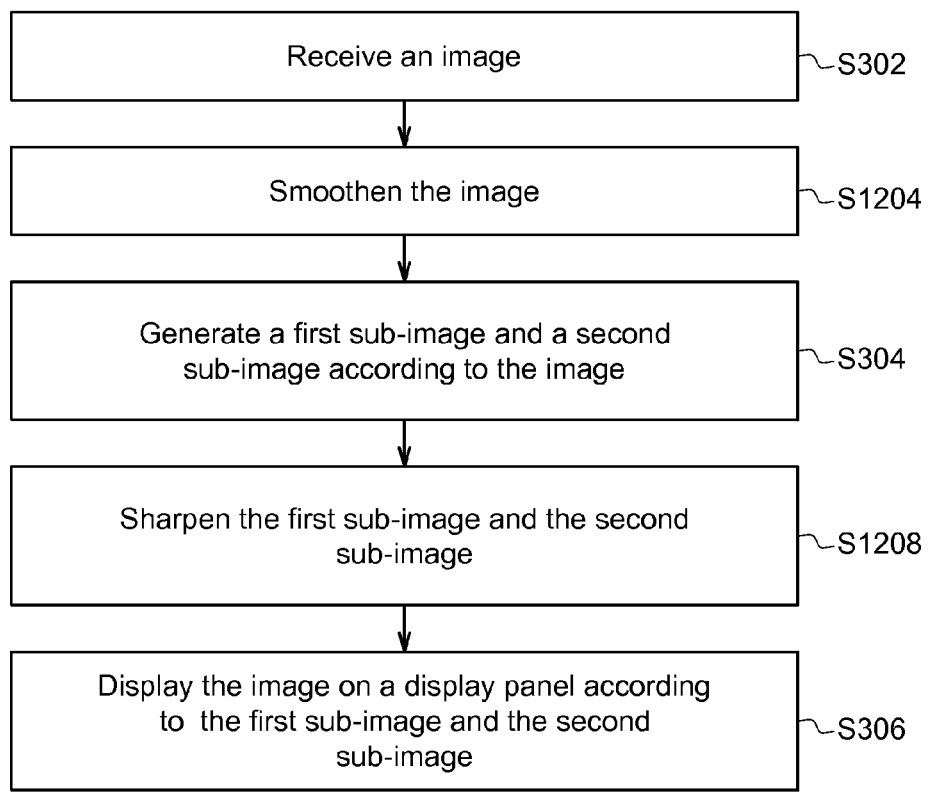
FIG. 12 illustrates a flowchart of a pixel driving method of an embodiment according to FIG. 3.

FIG. 12 illustrates a flowchart of a pixel driving method of an embodiment according to FIG. 3. Referring to FIG. 12, after step S302, the image processor 106 may smoothen the image I, as shown in step S1204. For example, the image I may be smoothed by Gaussian kernel or by sampling each pixel of the image I with different weighted values to increase the smoothing effect. This step may distribute the information of the central pixel (e.g., IP5 shown in FIG. 4) of the image I to the adjacent pixels so that the flicker issue can be decreased when displaying the following images. Besides, the image processor 106 may resize the image I before making the pixel arrangement so that the size of resized image can be closer to that of the display panel, thereby avoiding image distortions or image deformation. Furthermore, after step S304, the image processor 106 may sharpen the first sub-image SI1 and the second sub-image SI2, as shown in the step S1208. This step may improve the details of the display images.

Figure 13:
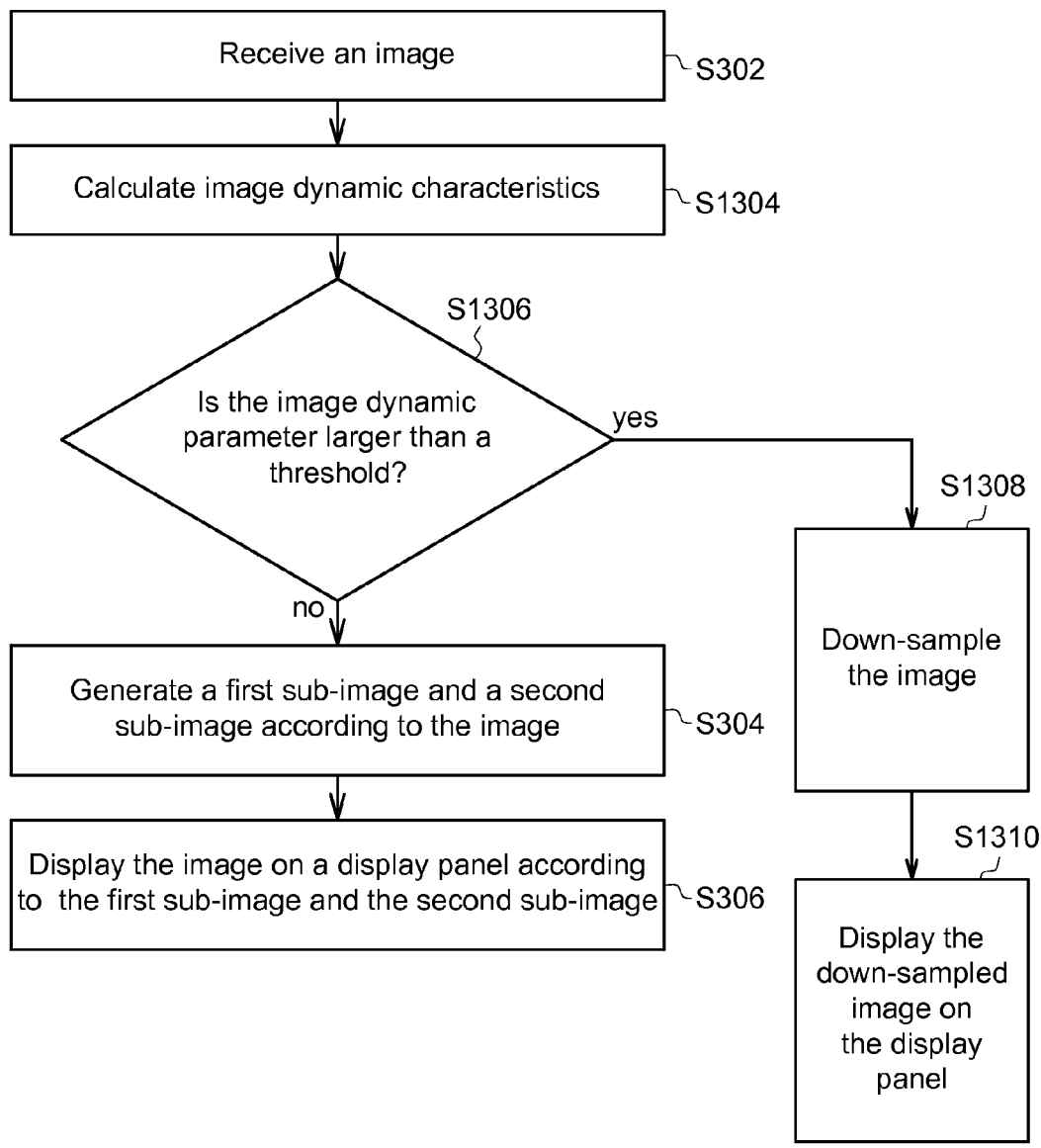
FIG. 13 illustrates a flowchart of a pixel driving method of another embodiment according to FIG. 3.

FIG. 13 illustrates a flowchart of a pixel driving method of another embodiment according to FIG. 3. As shown in FIG. 13, after step S300, the image processor 106 may calculate the image dynamic characteristics of the received image I and obtain an image dynamic parameter accordingly, as shown in step S1304. Then, in step S1306, the image processor 106 may determine whether the image dynamic parameter is larger than a threshold or not. If the image dynamic parameter is larger than the threshold, the procedure may proceed to step S1308, at which the image processor 106 may down-sample the received image I and then go to step 1310 to display the down-sampled image I on the display panel 102. For example, suppose that the received image I is a rapidly dynamic video. The image processor 106 may determine whether the image dynamic parameter of the image I is larger than a threshold or not. If so, the image processor 106 may down-sample the received image I to transfer it into an image with lower-resolution that compliances with the display panel 102. Hence, during the playback of a rapidly dynamic video, non-smooth playback issue can be avoided. On the other hand, if the image dynamic parameter is smaller than the threshold, the procedure may proceed to step S304 shown in FIG. 3, at which the image processor 106 may generate the first sub-image SI1 and the second sub-image SI2 according to the image I. Then, in step S306, the display panel 102 may display the image I according to the first sub-image SI1 and the second sub-image SI2.

Figure 14:
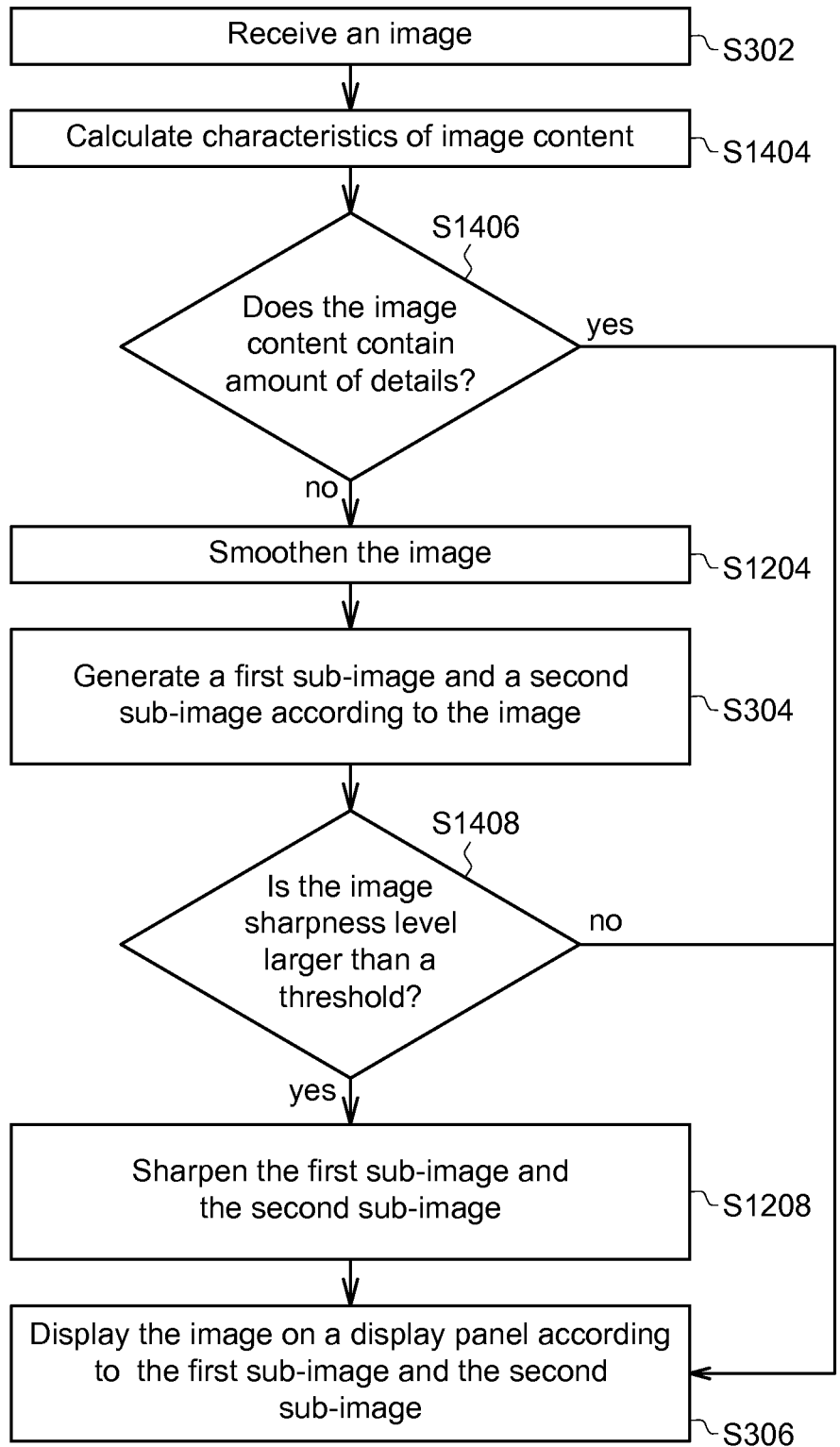
FIG. 14 is a flowchart of a pixel driving method of another embodiment according to FIG. 3.

FIG. 14 is a flowchart of a pixel driving method of another embodiment according to FIG. 3. Referring to FIG. 14, after step S302, the image processor 106 may calculate characteristics of the image content of the received image I, as shown in the step S1404. Then, at step S1406, the image processor 106 determines whether the image content contains amount of details according to the calculated characteristics of the image content. If yes, the procedure may skip step S1204, and does not perform smoothing operation on the image I. If not, the procedure may proceed to step S1204 to smoothen the image I. The purpose of the step is that when the image content contains a number of details or texts, an image smoothing operation may cause the lost of the image details of the image I, such that the display quality is decreased. Then, after step S304, the image processor 106 may determine whether the image sharpness level is larger than a threshold or not at step S1408. If not, the procedure may skip step S1208. If yes, then the procedure may proceeds to step S1208 to sharpen the first sub-image SI1 and the second sub-image SI2. The purpose of this step is that when an image is smooth, it would not need to sharpen this image because such sharpness operation may convert the smooth image into a high contrast image and hence produce incorrect boundary lines on it. Finally, at step S306, the display panel 102 may display the image according to the first sub-image SI1 and the second sub-image SI2, that is, the display panel 102 may display at least one of the first sub-image SI1 and the second sub-image SI2 with a plurality of pixel blocks PB.

As described above, the pixel driving method of the present disclosure may display image content with higher resolution on a display panel with lower resolution without changing the pin design of the driving circuits. The present disclosure also provides a plurality of ways of pixel arrangements and driving waveforms. Such pixel arrangements and/or driving waveforms can be arranged according to the image content to achieve better display performance.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A pixel driving method applied in a display panel comprising a plurality of pixel blocks that each of which comprises a first pixel, a second pixel, a third pixel and a fourth pixel, wherein the first pixel and the second pixel are arranged sequentially along a first direction, the third pixel and the fourth pixel are arranged sequentially along the first direction, the first pixel and the third pixel are arranged sequentially along a second direction, the first pixel, the second pixel, the third pixel and the fourth pixel respectively comprises a plurality of sub-pixels, the sub-pixels in the first pixel and the sub-pixels in the second pixel that are adjacent to the sub-pixels in the first pixel have the same color, the sub-pixels in the first pixel and the sub-pixels in the third pixel that are adjacent to the sub-pixels in the first pixel have the same color, the sub-pixels in the second pixel and the sub-pixels in the fourth pixel that are adjacent to the sub-pixels in the second pixel have the same color, the sub-pixels in the third pixel and the sub-pixels in the fourth pixel that are adjacent to the sub-pixels in the third pixel have the same color, and the pixel driving method comprises:

receiving a first image comprising a plurality of image points that each of which is corresponding to a display color;

generating a first sub-image and a second sub-image according to the first image, wherein the first sub-image displays a part of the image points through the pixel blocks, and the second sub-image displays another part of the image points through the pixel blocks; and displaying at least one of the first sub-image and the second sub-image on the display panel, wherein the image points comprises a first image point, a second image point, a third image point, a fourth image point, a fifth image point, a sixth image point, a seventh image point, an eighth image point and a ninth image point, the first image point, the second image point and the third image point are arranged sequentially along the first direction, the fourth image point, the fifth image point and the sixth image point are arranged sequentially along the first direction, the seventh image point, the eighth image point and the ninth image point are arranged sequentially along the first direction, the first image point, the fourth image point and the seventh image point are arranged sequentially along the second direction, and said generating the first sub-image comprises:

displaying the first image point by the first pixel;
displaying the third image point by the second pixel;
displaying the seventh image point by the third pixel; and
displaying the ninth image point with by fourth pixel; and
said generating the second sub-image comprises:
arranging the sub-pixels of the first pixel and the second pixel to define a first re-arranged pixel to display the second image point;
arranging the sub-pixels of the first pixel and the third pixel to define a second re-arranged pixel to display the fourth image point;
arranging the sub-pixels of the second pixel and the fourth pixel to define a third re-arranged pixel to display the sixth image point; and
arranging the sub-pixels of the third pixel and the fourth pixel to define a fourth re-arranged pixel to display the eighth image point.

2. The pixel driving method according to claim 1, wherein the first pixel comprises a first sub-pixel, a second sub-pixel, a third sub-pixel and a fourth sub-pixel, the second pixel comprises a fifth sub-pixel a sixth sub-pixel a seventh sub-pixel and an eighth sub-pixel, the third pixel comprises a ninth sub-pixel, a tenth sub-pixel, an eleventh sub-pixel and a twelfth sub-pixel, the fourth pixel comprises a thirteenth sub-pixel, a fourteenth sub-pixel, a fifteenth sub-pixel and a sixteenth sub-pixel;

wherein the first sub-pixel, the second sub-pixel, the fifth sub-pixel and the sixth sub-pixel are arranged sequentially along the first direction, the third sub-pixel, the fourth sub-pixel, the seventh sub-pixel and the eighth sub-pixel are arranged sequentially along the first direction, the ninth sub-pixel, the tenth sub-pixel, the thirteenth sub-pixel and the fourteenth sub-pixel are arranged sequentially along the first direction, the eleventh sub-pixel, the twelfth sub-pixel, the fifteenth sub-pixel and the sixteenth sub-pixel are arranged sequentially along the first direction, the first sub-pixel, third sub-pixel, ninth sub-pixel and the eleventh sub-pixel are arranged sequentially along the second direction;

wherein the first sub-pixel, the sixth sub-pixel, the eleventh sub-pixel and the sixteenth sub-pixel have the same color; the second sub-pixel, the third sub-pixel, the fifth sub-pixel, the eighth sub-pixel, the ninth sub-pixel, the twelfth sub-pixel, the fourteenth sub-pixel and the fifteenth sub-pixel have the same color;

the fourth sub-pixel, the seventh sub-pixel, the tenth sub-pixel and the thirteenth sub-pixel have the same color.

3. The pixel driving method according to claim 1, wherein said generating the second sub-image further comprises:
selecting a first string of the sub-pixels from the first pixel and the second pixel along the first direction, and combining the first string of the sub-pixels with a sub-pixel which is arranged along the second direction and adjacent to one end of the first string of the sub-pixels to form a 7-shaped sub-pixel arrangement to define the first re-arranged pixel;
selecting a second string of the sub-pixels from the first pixel and the third pixel along the second direction, and combining the second string of the sub-pixels with a sub-pixel which is arranged along the first direction and adjacent to one end of the second string of the sub-pixels to form the 7-shaped sub-pixel arrangement to define the second re-arranged pixel;
selecting a third string of the sub-pixels from the second pixel and the fourth pixel along the second direction, and combining the third string of the sub-pixels with a sub-pixel which is arranged along the first direction and adjacent to one end of the third string of the sub-pixels to form the 7-shaped sub-pixel arrangement to define the third re-arranged pixel; and
selecting a fourth string of the sub-pixels from the third pixel and the fourth pixel along the first direction, and combining the fourth string of the sub-pixels with a sub-pixel which is arranged along the second direction and adjacent to one end of the fourth string of the sub-pixels to form the 7-shaped sub-pixel arrangement to define the fourth re-arranged pixel.

4. The pixel driving method according to claim 1, wherein said generating the second sub-image further comprises:
selecting a first string of the sub-pixels from the first pixel and the second pixel along the first direction, and combining the first string of the sub-pixels with a sub-pixel which is arranged along the second direction and adjacent to a middle sub-pixel of the first string of the sub-pixels to form a T-shaped sub-pixel arrangement to define the first re-arranged pixel;
selecting a second string of the sub-pixels from the first pixel and the third pixel along the second direction, and combining the second string of the sub-pixels with a sub-pixel which is arranged along the first direction and adjacent to a middle sub-pixel of the second string of the sub-pixels to form the T-shaped sub-pixel arrangement to define the second re-arranged pixel;
selecting a third string of the sub-pixels from the second pixel and the fourth pixel along the second direction, and combining the third string of the sub-pixels with a sub-pixel which is arranged along the first direction and adjacent to a middle sub-pixel of the third string of the sub-pixels to form the T-shaped sub-pixel arrangement to define the third re-arranged pixel;
selecting a fourth string of the sub-pixels from the third pixel and the fourth pixel along the first direction, and combining the fourth string of the sub-pixels with a sub-pixel which is arranged along the second direction and adjacent to a middle sub-pixel of the fourth string of the sub-pixels to form the T-shaped sub-pixel arrangement to define the fourth re-arranged pixel.

5. The pixel driving method according to claim 1, further comprising:
displaying the first sub-image on the display panel in a first time period; and
displaying the second sub-image on the display panel in a second time period;
wherein sum of lengths of the first time period and the second time period is equal to display time of the first image, and the length of the first time period is equal to or unequal to the length of the second time period.

6. The pixel driving method according to claim 1, further comprising:
receiving a second image;
generating a third sub-image and a fourth sub-image according to the second image; and
displaying at least one of the third sub-image and the fourth sub-image through the pixel blocks to show the second image on the display panel.

7. The pixel driving method according to claim 6, further comprising:
displaying the first sub-image or the second sub-image in a first time period; and
displaying the third sub-image or the fourth sub-image in a second time period;
wherein display frequency of the first sub-image or display frequency of the second sub-image is the same with display frequency of the first image, and display frequency of the third sub-image or display frequency of the fourth sub-image is the same with display frequency of the second image.

8. The pixel driving method according to claim 1, further comprising:
calculating dynamic characteristics of the first image;
generating the first sub-image and the second sub-image according to the first image when the dynamic characteristics of the first image is less than a threshold; and
displaying at least one of the first sub-image and the second sub-image through the pixel blocks.

9. The pixel driving method according to claim 8, further comprising:
smoothening the first image when the dynamic characteristics of the first image is larger than the threshold.

10. The pixel driving method according to claim 1, further comprising:
after generating the first sub-image and the second sub-image, determining whether an image sharpness level of the first sub-image and the second sub-image is larger than a threshold or not, if yes then sharpening the first sub-image and the second sub-image, and if not then displaying at least one of the first sub-image and the second sub-image through the pixel blocks.

11. The pixel driving method according to claim 1, further comprising:
displaying an average of the first sub-image and the second sub-image with display frequency of the first image.

12. A display device, comprising:
a display panel comprising a plurality of pixel blocks that each of which comprises a first pixel, a second pixel, a third pixel and a fourth pixel, wherein the first pixel and the second pixel are arranged sequentially along a first direction, the third pixel and the fourth pixel are arranged sequentially along the first direction, the first pixel and the third pixel are sequentially arranged along a second direction, the first pixel, the second pixel, the third pixel and the fourth pixel respectively comprises a plurality of sub-pixels, the sub-pixels in the first pixel and the sub-pixels in the second pixel that are adjacent to the sub-pixels in the first pixel have the same color, the sub-pixels in the first pixel and the sub-pixels in the third pixel that are adjacent to the sub-pixels in the first pixel have the same color, the sub-pixels in the second pixel and the sub-pixels in the fourth pixel that are adjacent to the sub-pixels in the second pixel have the same color, the sub-pixels in the third pixel and the sub-pixels in the fourth pixel that are adjacent to the sub-pixels in the third pixel have the same color; and a pixel driving circuit, coupled to the display panel, configured to receive a first image, generate a first sub-image and a second sub-image according to the first image, and display at least one of the first sub-image and the second sub-image on the display panel, wherein the first image comprises a plurality of image points that each of which is corresponding to a display color, the first sub-image displays a part of the image points through the pixel blocks, and the second sub-image displays another part of the image points through the pixel blocks, wherein the first pixel comprises a first sub-pixel, a second sub-pixel, a third sub-pixel and a fourth sub-pixel, the second pixel comprises a fifth sub-pixel a sixth sub-pixel a seventh sub-pixel and an eighth sub-pixel, the third pixel comprises a ninth sub-pixel, a tenth sub-pixel, an eleventh sub-pixel and a twelfth sub-pixel, the fourth pixel comprises a thirteenth sub-pixel, a fourteenth sub-pixel, a fifteenth sub-pixel and a sixteenth sub-pixel, wherein the first sub-pixel, the second sub-pixel, the fifth sub-pixel and the sixth sub-pixel are arranged sequentially along the first direction, the third sub-pixel, the fourth sub-pixel, the seventh sub-pixel and the eighth sub-pixel are arranged sequentially along the first direction, the ninth sub-pixel, the tenth sub-pixel, the thirteenth sub-pixel and the fourteenth sub-pixel are arranged sequentially along the first direction, the eleventh sub-pixel, the twelfth sub-pixel, the fifteenth sub-pixel and the sixteenth sub-pixel are arranged sequentially along the first direction, the first sub-pixel, third sub-pixel, ninth sub-pixel and the eleventh sub-pixel are arranged sequentially along the second direction, wherein the first sub-pixel, the sixth sub-pixel, the eleventh sub-pixel and the sixteenth sub-pixel have the same color; the second sub-pixel, the third sub-pixel, the fifth sub-pixel, the eighth sub-pixel, the ninth sub-pixel, the twelfth sub-pixel, the fourteenth sub-pixel and the fifteenth sub-pixel have the same color; the fourth sub-pixel, the seventh sub-pixel, the tenth sub-pixel and the thirteenth sub-pixel have the same color, and wherein the image points comprises a first image point, a second image point, a third image point, a fourth image point, a fifth image point, a sixth image point, a seventh image point, an eighth image point and a ninth image point, the first image point, the second image point and the third image point are arranged sequentially along the first direction, the fourth image point, the fifth image point and the sixth image point are arranged sequentially along the first direction, the seventh image point, the eighth image point and the ninth image point are arranged sequentially along the first direction, the first image point, the fourth image point and the seventh image point are arranged sequentially along the second direction, and the pixel driving circuit is further configured to:

display the first image point by the first pixel;
display the third image point by the second pixel;
display the seventh image point by the third pixel;
display the ninth image point by the fourth pixel;

arrange the sub-pixels of the first pixel and the second pixel to define a first re-arranged pixel to display the second image point;

arrange the sub-pixels of the first pixel and the third pixel to define a second re-arranged pixel to display the fourth image point;

arrange the sub-pixels of the second pixel and the fourth pixel to define a third re-arranged pixel to display the sixth image point; and arrange the sub-pixels of the third pixel and the fourth pixel to define a fourth re-arranged pixel to display the eighth image point.

13. The display device according to claim 12, wherein the pixel driving circuit is further configured to:

select a first string of the sub-pixels from the first pixel and the second pixel along the first direction, and combine the first string of the sub-pixels with a sub-pixel which is arranged along the second direction and adjacent to one end of the first string of the sub-pixels to form a 7-shaped sub-pixel arrangement to define the first re-arranged pixel;

select a second string of the sub-pixels from the first pixel and the third pixel along the second direction, and combine the second string of the sub-pixels with a sub-pixel which is arranged along the first direction and adjacent to one end of the second string of the sub-pixels to form the 7-shaped sub-pixel arrangement to define the second re-arranged pixel;

select a third string of the sub-pixels from the second pixel and the fourth pixel along the second direction, and combine the third string of the sub-pixels with a sub-pixel which is arranged along the first direction and adjacent to one end of the third string of the sub-pixels to form the 7-shaped sub-pixel arrangement to define the third re-arranged pixel; and select a fourth string of the sub-pixels from the third pixel and the fourth pixel along the first direction, and combine the fourth string of the sub-pixels with a sub-pixel which is arranged along the second direction and adjacent to one end of the fourth string of the sub-pixels to form the 7-shaped sub-pixel arrangement to define the fourth re-arranged pixel.

14. The display device according to claim 12, wherein the pixel driving circuit is further configured to:

select a first string of the sub-pixels from the first pixel and the second pixel along the first direction, and combine the first string of the sub-pixels with a sub-pixel which is arranged along the second direction and adjacent to a middle sub-pixel of the first string of the sub-pixels to form a T-shaped sub-pixel arrangement to define the first re-arranged pixel;

select a second string of the sub-pixels from the first pixel and the third pixel along the second direction, and combine the second string of the sub-pixels with a sub-pixel which is arranged along the first direction and adjacent to a middle sub-pixel of the second string of the sub-pixels to form the T-shaped sub-pixel arrangement to define the second re-arranged pixel;

select a third string of the sub-pixels from the second pixel and the fourth pixel along the second direction, and combine the third string of the sub-pixels with a sub-pixel which is arranged along the first direction and adjacent to a middle sub-pixel of the third string of the sub-pixels to form the T-shaped sub-pixel arrangement to define the third re-arranged pixel; and select a fourth string of the sub-pixels from the third pixel and the fourth pixel along the first direction, and combine the fourth string of the sub-pixels with a sub-pixel which is arranged along the second direction and adjacent to a middle sub-pixel of the fourth string of the sub-pixels to form the T-shaped sub-pixel arrangement to define the fourth re-arranged pixel.

15. The display device according to claim 12, wherein the pixel driving circuit is further configured to:
   display the first sub-image on the display panel in a first time period; and
   display the second sub-image on the display panel in a second time period;
   wherein sum of lengths of the first time period and the second time period is equal to display time of the first image, the length of the first time period is equal to or unequal to the length of the second time period, and display frequency of the first sub-image or display frequency of the second sub-image is twice as long as display frequency of the first image.

16. The display device according to claim 12, wherein the pixel driving circuit is further configured to:
   receive a second image;
   generate a third sub-image and a fourth sub-image according to the second image;
   display the first sub-image or the second sub-image in a first time period; and
   display the third sub-image or the fourth sub-image in a second time period;
   wherein display frequency of the first sub-image or display frequency of the second sub-image is equal to display frequency of the first image, and display frequency of the third sub-image or display frequency of the fourth sub-image is equal to display frequency of the second image.

17. The display device according to claim 12, wherein the pixel driving circuit displays an average of the first sub-image and the second sub-image with display frequency of the first image.

18. A pixel driving circuit, comprising:
   an image processor, receiving a first image, generating a first sub-image and a second sub-image according to the first image, wherein the first image comprises a plurality of image points that each of which is corresponding to a display color; and
   a driver, coupled to the image processor, outputting at least one of the first sub-image and the second sub-image,
   wherein the first sub-image and the second sub-image are applied in a display panel comprising a plurality of pixel blocks, the first sub-image displays a part of the image points through the pixel blocks, the second sub-image displays another part of the image points through the pixel blocks, each of the pixel blocks comprises a first pixel, a second pixel, a third pixel and a fourth pixel, the first pixel and the second pixel are arranged sequentially along a first direction, the third pixel and the fourth pixel are arranged sequentially along the first direction, the first pixel and the third pixel are arranged sequentially along a second direction, the first pixel, the second pixel, the third pixel and the fourth pixel respectively comprises a plurality of sub-pixels, the sub-pixels in the first pixel and the sub-pixels in the second pixel that are adjacent to the sub-pixels in the first pixel have the same color, the sub-pixels in the first pixel and the sub-pixels in the third pixel that are adjacent to the sub-pixels in the first pixel have the same color, the sub-pixels in the second pixel and the sub-pixels in the fourth pixel that are adjacent to the sub-pixels in the second pixel have the same color, the sub-pixels in the third pixel and the sub-pixels in the fourth pixel that are adjacent to the sub-pixels in the third pixel have the same color, and
   wherein the image points comprises a first image point, a second image point, a third image point, a fourth image point, a fifth image point, a sixth image point, a seventh image point, an eighth image point and a ninth image point, the first image point, the second image point and the third image point are arranged sequentially along the first direction, the fourth image point, the fifth image point and the sixth image point are arranged sequentially along the first direction, the seventh image point, the eighth image point and the ninth image point are arranged sequentially along the first direction, the first image point, the fourth image point and the seventh image point are arranged sequentially along the second direction, and said generating the first sub-image comprises:
   displaying the first image point by the first pixel;
   displaying the third image point by the second pixel;
   displaying the seventh image point by the third pixel; and
   displaying the ninth image point with by fourth pixel; and
   said generating the second sub-image comprises:
   arranging the sub-pixels of the first pixel and the second pixel to define a first re-arranged pixel to display the second image point;
   arranging the sub-pixels of the first pixel and the third pixel to define a second re-arranged pixel to display the fourth image point;
   arranging the sub-pixels of the second pixel and the fourth pixel to define a third re-arranged pixel to display the sixth image point; and
   arranging the sub-pixels of the third pixel and the fourth pixel to define a fourth re-arranged pixel to display the eighth image point.

* * * * *